United States Patent
Cai et al.

(10) Patent No.: US 11,941,411 B2
(45) Date of Patent: Mar. 26, 2024

(54) APPLICATION STARTING METHOD AND RELATED DEVICE

(71) Applicant: Tencent Technology (Shenzhen) Company Limited, Guangdong (CN)

(72) Inventors: Lingbo Cai, Shenzhen (CN); Liang Ma, Shenzhen (CN); Qingjie Lin, Shenzhen (CN); Hongzheng Ke, Shenzhen (CN); Yue Hu, Shenzhen (CN); Canhui Huang, Shenzhen (CN); Yuyang Peng, Shenzhen (CN); Deming Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 125 days.

(21) Appl. No.: 17/709,039

(22) Filed: Mar. 30, 2022

(65) Prior Publication Data
US 2022/0222088 A1 Jul. 14, 2022

Related U.S. Application Data

(63) Continuation of application No. PCT/CN2021/083779, filed on Mar. 30, 2021.

(30) Foreign Application Priority Data
May 8, 2020 (CN) .......................... 202010381949.6

(51) Int. Cl.
*G06F 9/44* (2018.01)
*G06F 9/445* (2018.01)

(52) U.S. Cl.
CPC ...... *G06F 9/44505* (2013.01); *G06F 9/44526* (2013.01)

(58) Field of Classification Search
CPC .......................... G06F 9/44505; G06F 9/44526
See application file for complete search history.

(56) References Cited

U.S. PATENT DOCUMENTS 10,877,826 B2    12/2020  Hu et al.
2008/0295110 A1  11/2008  Muscarella et al.
(Continued)

FOREIGN PATENT DOCUMENTS

CN    107102880 A    8/2017
CN    109032691 A    12/2018
(Continued)

OTHER PUBLICATIONS

WIPO English translated CN110166543 (Year: 2019).*
(Continued)

*Primary Examiner* — Hanh Thi-Minh Bui
(74) *Attorney, Agent, or Firm* — Crowell & Moring LLP

(57) ABSTRACT

Embodiments of this disclosure provide a method for starting an application and a related apparatus. The method includes the following: A user terminal may acquire a configuration parameter of a target application from a data management server when a start instruction for the target application is detected. The configuration parameter includes plugin configuration information and code package configuration information. The target application can be executed by using a target code package and a locally cached target plugin.

18 Claims, 7 Drawing Sheets

(56) References Cited

U.S. PATENT DOCUMENTS

| | | | | |
|---|---|---|---|---|
| 2008/0320472 A1* | 12/2008 | Laska | ............ | G06F 11/3664 |
| | | | | 717/178 |
| 2015/0293769 A1* | 10/2015 | Zhong | ............ | G06F 8/61 |
| | | | | 717/174 |
| 2016/0048382 A1* | 2/2016 | Xi | ............ | G06F 8/61 |
| | | | | 717/174 |
| 2021/0165666 A1 | 6/2021 | Xu et al. | | |

FOREIGN PATENT DOCUMENTS

| | | | |
|---|---|---|---|
| CN | 110166543 A | | 8/2019 |
| CN | 110389935 A | | 10/2019 |
| CN | 110908738 A | | 3/2020 |
| WO | WO-2020135129 A1 | * | 7/2020 |
| WO | WO 2021/013242 A1 | | 1/2021 |

OTHER PUBLICATIONS

WIPO English translated CN110908738 (Year: 2019).*
International Search Report and Written Opinion for priority application No. PCT/CN2021/083779 dated Jul. 5, 2021, 9p, in Chinese language.
English language translation of the International Search Report for priority application No. PCT/CN2021/083779 dated Jul. 5, 2021, 2p.
Concise Explanation for International Written Opinion for priority application No. PCT/CN2021/083779.

* cited by examiner

APPLICATION STARTING METHOD AND RELATED DEVICE

RELATED APPLICATION

This application is a continuation application of International Patent No. PCT/CN2021/083779, filed Mar. 30, 2021, which claims priority to Chinese Patent Application No. 202010381949.6, entitled "METHOD AND APPARATUS FOR STARTING APPLICATION AND COMPUTER-READABLE STORAGE MEDIUM", and filed with the China National Intellectual Property Administration on May 8, 2020. The applications above are hereby incorporated by reference in their entireties.

TECHNICAL FIELD

This disclosure relates to the field of computer technologies, and in particular, to application start.

BACKGROUND

Currently, when a developer of a mini-game/mini-program requires universal code, the developer usually writes the universal code or downloads the universal code from a related site, and packs the universal code into a code package of the mini-game/mini-program. A client (such as WeChat) on a user terminal caches the mini-game/mini-program including the same universal code and code of the mini-game/mini-program. When a user starts a new mini-game/mini-program, the user needs to download data including the complete code (the universal code and the code of the mini-game/mini-program) from a backend.

SUMMARY

Embodiments of this disclosure provide a method for starting an application and a related apparatus. In this way, a start speed of an application can be increased, a storage space of a user terminal is saved, and development costs of a developer can be reduced.

In an aspect, an embodiment of this disclosure provides a method for starting an application. The method is performed by the user terminal. The method includes:

acquiring a configuration parameter of a target application from a data management server when a start instruction for the target application is detected, the configuration parameter including plugin configuration information and code package configuration information;

acquiring, from the data management server, a target code package corresponding to the code package configuration information when locally cached plugins include a target plugin corresponding to the plugin configuration information; and executing the target application by using the target code package and the locally cached target plugin.

In another aspect, an embodiment of this disclosure provides a method for starting an application. The method is performed by a data management server. The method includes:

receiving a first data acquisition request transmitted by a user terminal when a start instruction for a target application is detected, the first data acquisition request including an application identifier of the target application;

transmitting a configuration parameter of the target application to the user terminal in response to the first data acquisition request, the configuration parameter including plugin configuration information and code package configuration information;

receiving a second data acquisition request transmitted by the user terminal when it is determined that locally cached plugins include a target plugin corresponding to the plugin configuration information, the second data acquisition request including the code package configuration information; and transmitting a target code package corresponding to the code package configuration information to the user terminal in response to the second data acquisition request, to cause the user terminal to execute the target application by using the target code package and the locally cached target plugin.

In another aspect, an embodiment of this disclosure provides a user terminal for starting an application. The apparatus includes:

an acquisition module, configured to: acquire a configuration parameter of a target application from a data management server when a start instruction for the target application is detected, the configuration parameter including plugin configuration information and code package configuration information; and acquire a target code package corresponding to the code package configuration information from the data management server when locally cached plugins include a target plugin corresponding to the plugin configuration information; and a processing module, configured to execute the target application by using the target code package and the locally cached target plugin.

In another aspect, an embodiment of this disclosure provides a data management server for starting an application. The apparatus includes:

a receiving module, configured to receive a first data acquisition request transmitted by a user terminal when a start instruction for a target application is detected, the first data acquisition request including an application identifier of the target application; and a transmitting module, configured to transmit a configuration parameter of the target application to the user terminal in response to the first data acquisition request, the configuration parameter including plugin configuration information and code package configuration information.

The receiving module is further configured to receive a second data acquisition request transmitted by the user terminal when it is determined that locally cached plugins include a target plugin corresponding to the plugin configuration information, the second data acquisition request including the code package configuration information.

The transmitting module being further configured to transmit a target code package corresponding to the code package configuration information to the user terminal in response to the second data acquisition request, to cause the user terminal to execute the target application by using the target code package and the locally cached target plugin.

In another aspect, an embodiment of this disclosure provides a user terminal. The user terminal includes a processor, a storage apparatus, a network interface, and an input/output device. The processor, the storage apparatus, the network interface, and the input/output device are connected to each other. The network interface is controlled by the processor and configured to transmit and receive data. The input/output device is configured to detect a touch operation and output an image. The storage apparatus is configured to store a computer program. The computer program includes program instructions. The processor is configured to call the program instructions to perform the method for starting an application described in the above aspects.

In another aspect, an embodiment of this disclosure provides a data management server. The data management server includes a processor, a storage apparatus, and a network interface. The processor, the storage apparatus, and the network interface are connected to each other. The network interface is controlled by the processor and configured to transmit and receive data. The storage apparatus is configured to store a computer program. The computer program includes program instructions. The processor is configured to call the program instructions to perform the method for starting an application described in the above aspects.

In another aspect, an embodiment of this disclosure provides non-transitory a computer-readable storage medium. The computer-readable storage medium stores a computer program. The computer program instructions, when executed by the processor, cause to perform the method for starting an application described in the above aspects.

In still another aspect, an embodiment of this disclosure provides a computer program product including instructions. The instructions, when executed on a computer, cause the computer to perform the method for starting an application described in the above aspects.

In the embodiments of this disclosure, a user terminal may acquire a configuration parameter of a target application from a data management server when a start instruction for the target application is detected. The configuration parameter includes plugin configuration information and code package configuration information. The user terminal only needs to acquire a target code package corresponding to the code package configuration information from the data management server when locally cached plugins include a target plugin corresponding to the plugin configuration information. Therefore, the target application can be executed by using the target code package and the locally cached target plugin. In this way, a start speed of an application can be increased, and the user terminal no longer needs to store repeated plugin code, thereby saving the storage space of the user terminal.

BRIEF DESCRIPTION OF THE DRAWINGS

To describe the technical solutions of the embodiments of this disclosure or the existing technology more clearly, the following briefly introduces the accompanying drawings required for describing the embodiments or the existing technology. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

The technical solutions in the embodiments of this disclosure are clearly and completely described in the following with reference to the accompanying drawings in the embodiments of this disclosure. Apparently, the described embodiments are merely some rather than all of the embodiments of this disclosure. All other embodiments obtained by persons of ordinary skill in the art based on the embodiments of this disclosure without creative efforts shall fall within the protection scope of this disclosure.

Relatively high development costs are required by a developer to develop a mini-game/mini-program. Massive pieces of similar or same universal code spend efforts. A client is required to store many pieces of same code. Therefore, a lot of storage space is occupied, and a longer data downloading time is required to start a new mini-game/mini-program, affecting a start speed. In view of the above problems, the embodiments of this disclosure provide a data processing method, to accelerate the start speed of an application, save storage space of a user terminal, and reduce the development costs for the developer.

Implementation details of the technical solutions of the embodiments of this disclosure are described below in detail.

Figure 1:
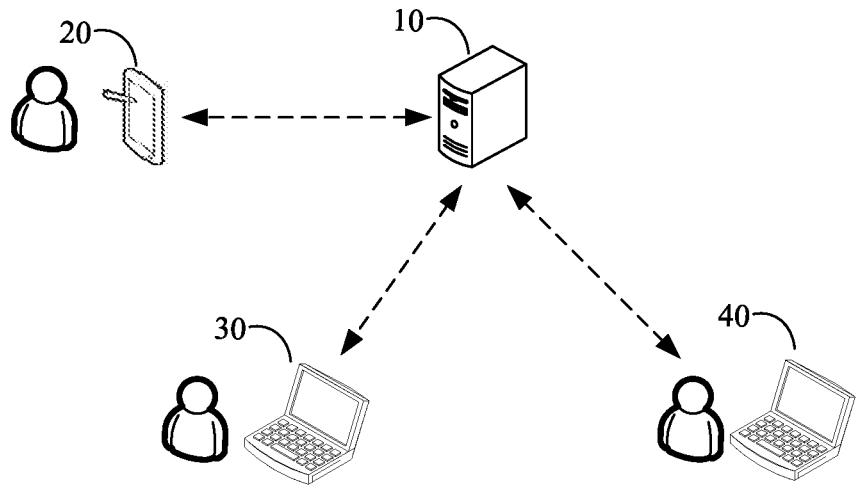
FIG. 1 is a schematic architectural diagram of a data management system according to an embodiment of this disclosure.

FIG. 1 is a schematic architectural diagram of a data management system according to an embodiment of this disclosure. The data management system includes a data management server 10, a user terminal 20, a plugin development terminal 30, and an application development terminal 40.

The data management server 10 may be an independent physical server, a server cluster composed of a plurality of physical servers or a distributed system, or a cloud server providing a cloud computing service. The data management server 10 may be used as a data management platform to provide a unified plugin management service for a plugin developer, an application developer, and a user. For example, the data management server is configured to manage application of the plugin developer for plugins, check the plugins uploaded by the plugin developer, manage configuration and use of the plugins when an application developer develops applications such as a mini-game/mini-program, store configuration parameters (including plugin configuration information and code package configuration information) of the mini-game/mini-program, and provide required plugins and/or code packages for the mini-game/mini-program to start.

As a data management platform, the data management server is configured with unified universal plugins, to provide required plugins for the user to start an application and for the application developer to develop and test the application, and provide a plugin increment package when the user terminal does not cache a correct plugin locally to cause the user terminal to acquire the correct plugin (for example, a target plugin), so as to successfully start the application. In addition, the data management server may further generate and maintain configuration parameters of the application based on a plugin and a code package of the application, and provide a corresponding code package to the user terminal based on the configuration parameters when the user terminal starts the application.

A plugin is a code fragment that can be used for a plurality of mini-games/mini-programs. A mini-program is an application that can be used without being downloaded and installed. A mini-game is a game application that can be used without being downloaded and installed, which is similar to the mini-program. The mini-game can be played by clicking/tapping without being downloaded and installed, which is convenient in experience.

The user terminal 20, the plugin development terminal 30, and the application development terminal 40 may include electronic devices such as a smart phone, a tablet computer, a notebook computer, a desktop computer, a smart speaker, and a smart watch.

The user terminal 20 is configured for the user to use applications such as the mini-game/mini-program. The plugin development terminal 30 is configured for the plugin developer to use develop a plugin by using a developer tool and upload a developed plugin to the data management server 10. The application development terminal 40 is configured for the application developer to develop an application by using the plugin developed by the plugin developer and upload a plugin and a code package corresponding to a developed application to the data management server 10.

Specifically, the user terminal 20 may acquire a configuration parameter of a target application from the data management server 10 when a start instruction of a user for the target application is detected. The configuration parameter includes plugin configuration information and code package configuration information. The user terminal 20 may only acquire a target code package corresponding to the code package configuration information from the data management server 10 when locally cached plugins include a target plugin corresponding to the plugin configuration information. Therefore, the target application can be executed by using the target code package and the locally cached target plugin. In this way, a start speed of an application can be increased, and the user terminal 20 no longer needs to store repeated plugin code, thereby saving the storage space of the user terminal. In addition, the plugin development terminal 30 may directly acquire a plugin required for development from the data management server 10 to complete application development by using the application development terminal 40 without a need to develop the plugin. Therefore, the development costs can be reduced for the developer.

Figure 2:
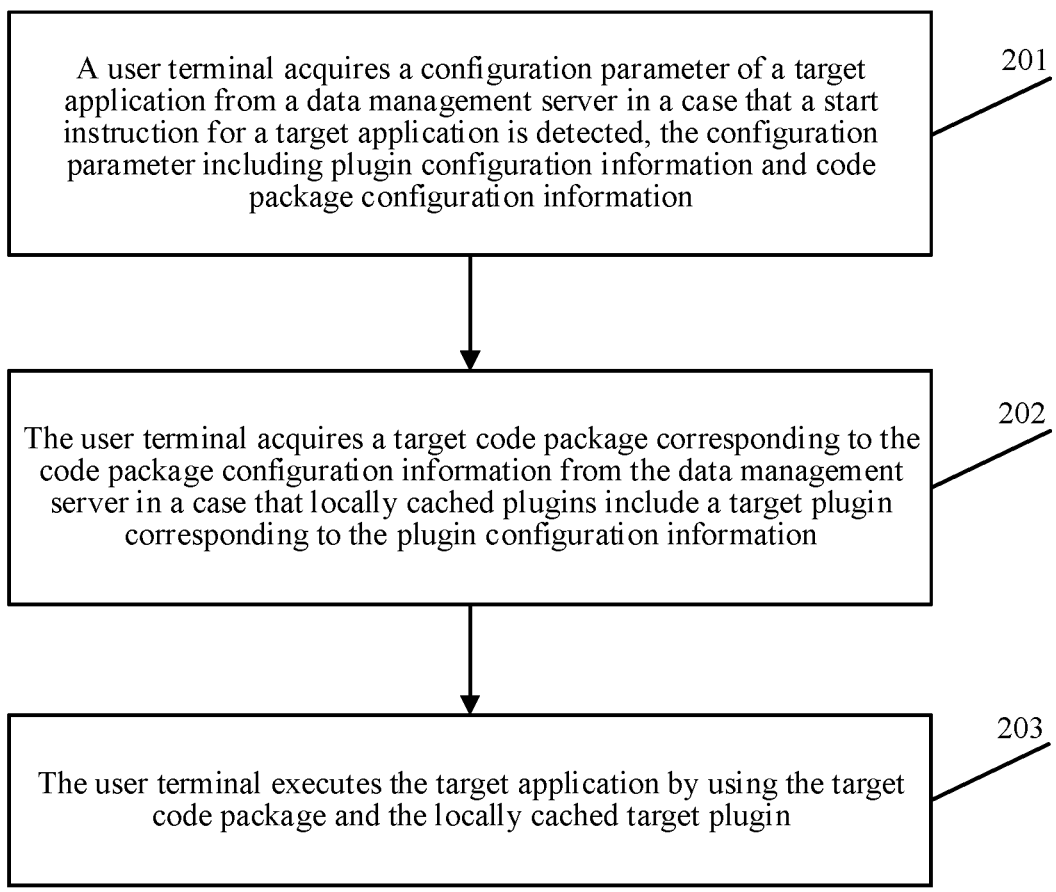
FIG. 2 is a schematic flowchart of a method for starting an application according to an embodiment of this disclosure.

FIG. 2 is a schematic flowchart of a method for starting an application according to an embodiment of this disclosure based on the data management system shown in FIG. 1. The method for starting an application includes the following steps:

201: A user terminal acquires a configuration parameter of a target application from a data management server when a start instruction for the target application is detected, the configuration parameter including plugin configuration information and code package configuration information.

The target application may be a mini-program or a mini-game. Specifically, the target application may be any of the mini-program or the mini-game provided for a user to use. A client (such as a WeChat client) may be installed on the user terminal. A display interface of the client may display a plurality of mini-games/mini-programs for the user to use. The user may start the target application by using the client. For example, the user clicks/taps an icon or an identifier of the target application on the display interface of the client. Definitely, the user may further start the target application by clicking/tapping a shortcut of the target application in a system desktop of the user terminal.

Specifically, the user terminal may acquire the configuration parameter of the target application from the data management server when the start instruction of the user for the target application is detected. The configuration parameter includes the plugin configuration information and the code package configuration information. The plugin configuration information indicates a plugin required for executing the target application. The code package configuration information indicates a code package written by an application developer for the target application.

In some exemplary implementations, the plug may include a plurality of types of plugs such as a basic library domain plugin, a developer domain plugin, an open data domain plugin, and an independent domain plugin. The target plugin may include one or more plugins. That is to say, one application may use a plurality of plugins. An execution environment of the plug may be referred to as an execution domain (referred to as a domain for short). The domain is an isolated JS context environment, and is a closed container configured to execute JS code. Different types of applications may be divided into different domains. For example, a mini-game has three basic domains, including a basic library domain, a developer domain, and an open data domain. A mini-program has two basic domains, including a basic library domain and a developer domain. The open data domain is a domain where a social relationship chain is located (for example, a WeChat friendship chain), and is used to process data such as a game leaderboard.

202: The user terminal acquires a target code package corresponding to the code package configuration information from the data management server when locally cached plugins include a target plugin corresponding to the plugin configuration information.

203: The user terminal executes the target application by using the target code package and the locally cached target plugin.

Specifically, after the user terminal acquires the configuration parameter of the target application, the user terminal first queries the locally cached plugins to determine whether the locally cached plugins include the target plugin corresponding to the plugin configuration information in the configuration parameter. If the target plugin is locally cached, the target application is executed. The user terminal only needs to acquire the target code package corresponding to the code package configuration information from the data management server, and then executes the target application by using the target code package and the locally cached target plugin.

In some exemplary implementations, the user terminal may inject a basic library. Injecting the basic library means parsing and executing code data corresponding to the basic library on the user terminal. Then an execution domain required for the target plugin is created by using the basic library. The target plugin and the corresponding target code package are injected into the execution domain. After all target plugins and corresponding target code packages have been injected, the execution of the target application can be realized.

In some exemplary implementations, frequently used plugins may be cached by the user terminal in a local storage space. For example, the user terminal may acquire use frequencies of all of the plugins from the data management server. If the use frequencies reach a preset frequency threshold, the user terminal may cache the corresponding plugins in the local storage space. In this way, during start of the application, plugins from the locally cached plugins required for a current application may be preferentially reused.

In this embodiment of this disclosure, the user terminal may acquire the configuration parameter of the target application from the data management server when the start instruction for the target application is detected. The configuration parameter includes the plugin configuration information and the code package configuration information. The user terminal only needs to acquire the target code package corresponding to the code package configuration information from the data management server when the locally cached plugins include the target plugin corresponding to the plugin configuration information. Therefore, the target application can be executed by using the target code package and the locally cached target plugin. In this way, a start speed of an application can be increased, the storage space of the user terminal can be saved, and the development costs of a developer can be reduced.

In some exemplary implementations, the plugin configuration information includes a plugin identifier and a plugin version of the target plugin. The user terminal may first acquire the locally cached plugins, and search the locally cached plugins for an undetermined plugin same as the plugin identifier. If the undetermined plugin is found, the target application is executed by using the target code package and the undetermined plugin.

In some exemplary implementations, the plugin configuration information includes the plugin version of the target plugin. After founding the undetermined plugin, the user terminal may detect whether a plugin version of the undetermined plugin is the same as the plugin version of the target plugin. If so, the target application may be executed by using the target code package and the undetermined plugin. If not, the user terminal may acquire a first plugin increment package between the plugin version of the undetermined plugin and the plugin version of the target plugin from the data management server, and then generate the target plugin by using the undetermined plugin and the first plugin increment package, so as to execute the target application by using the target code package and the generated target plugin. For example, the plugin version of the target plugin is version (v.) 5.0, and the plugin version of the undetermined plugin is v. 3.0. Therefore, the user terminal may acquire a first plugin increment package between v. 3.0 and v. 5.0 of the target plugin from the data management server, and generates a v. 5.0 target plugin by using the plugin of v. 3.0 and the first plugin increment package. Downloading the plugin increment package can effectively reduce a downloaded data amount, thereby accelerating the start speed of an application.

In some exemplary implementations, if the plugin version is an auto update version, the user terminal may acquire a latest version of the target plugin from the data management server, and detect whether the plugin version of the undetermined plugin is the same as the latest version of the target plugin. If so, the target application is executed by using the target code package and the undetermined plugin. If not, the user terminal may acquire a second plugin increment package between the plugin version of the undetermined plugin and the plugin version of the target plugin from the data management server, and then generate the target plugin of a latest version by using the undetermined plugin and the second plugin increment package, so as to execute the target application by using the target code package and the target plugin of the latest version.

In some exemplary implementations, if the locally cached plugins do not include the target plugin corresponding to the plugin configuration information, in addition to acquiring the target code package corresponding to the code package configuration information, the user terminal needs to acquire the target plugin corresponding to the plugin configuration information from the data management server, to execute the target application by using the target code package and the target plugin. That is to say, when the local cache does not include the required plugin, a complete data package is required to be acquired from the data management server. The complete data package includes both a plugin and a code package.

Figure 3:
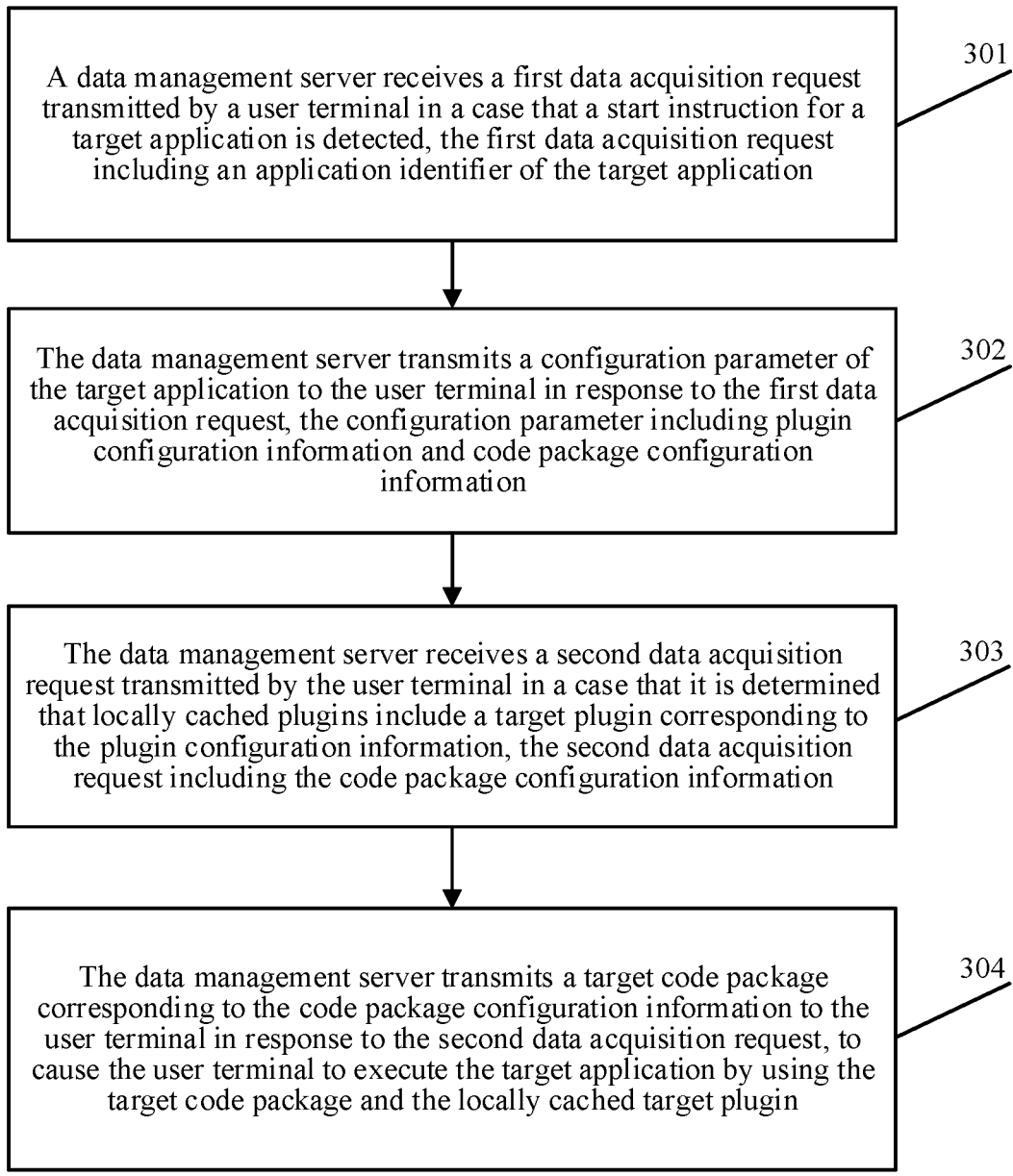
FIG. 3 is a schematic flowchart of another method for starting an application according to an embodiment of this disclosure.

FIG. 3 is a schematic flowchart of another method for starting an application according to an embodiment of this disclosure based on the data management system shown in FIG. 1. The method for starting an application includes the following steps:

301: The data management server receives a first data acquisition request transmitted by a user terminal when a start instruction for a target application is detected, the first data acquisition request including an application identifier of the target application.

302: The data management server transmits a configuration parameter of the target application to the user terminal in response to the first data acquisition request, the configuration parameter including plugin configuration information and code package configuration information.

Specifically, the user terminal may transmit the first data acquisition request to the data management server when detecting the start instruction for the target application. The first data acquisition request includes an identifier of the target application. The data management server acquires the configuration parameter of the target application according to the identifier of the target application. The configuration parameter includes the plugin configuration information and the code package configuration information. The configuration parameter of the target application is transmitted to the user terminal.

303: The data management server receives a second data acquisition request transmitted by the user terminal when it is determined that locally cached plugins include a target plugin corresponding to the plugin configuration information, the second data acquisition request including the code package configuration information.

304: The data management server transmits a target code package corresponding to the code package configuration information to the user terminal in response to the second data acquisition request, to cause the user terminal to execute the target application by using the target code package and the locally cached target plugin.

Specifically, the user terminal transmits the second data acquisition request to the data management server when determining that the locally cached plugins include the target plugin corresponding to the plugin configuration information. The second data acquisition request includes the code package configuration information. The data management server acquires the target code package corresponding to the code package configuration information, and transmits the target code package to the user terminal. In this way, the user terminal can execute the target application by using the target code package and the locally cached target plugin after receiving the target code package.

In some exemplary implementations, the user terminal may transmit a third data acquisition request to the data management server when determining that the locally cached plugins do not include the target plugin corresponding to the plugin configuration information. The third data acquisition request includes the plugin configuration information and the code package configuration information. The data management server acquires the target plugin corresponding to the plugin configuration information and the target code package corresponding to the code package configuration information, and transmits the target plugin and the target code package to the user terminal. In this way, the user terminal can execute the target application by using the target plugin and the target code package.

In some exemplary implementations, the data management server may be specifically a WeChat public platform, and is configured to manage application, configuration, and checking of plugins. The data management server may receive plugin application information submitted by an application developer for the target application. The plugin application information includes a plugin identifier, a plugin version, and a plugin type. When developing a target application (for example, a mini-game), the application developer may apply to use a plugin provided by the data management server according to development requirements. The data management server acquires a corresponding target plugin from a plugin library according to the plugin application information, and transmits the target plugin to the user terminal corresponding to the application developer. The application developer writes a code package (denoted as a target code package). After acquiring the required target plugin, the application developer may compile the target plugin and the target code package by using a developer tool such as integrated development environment (IDE), to perform trial execution of the target application, and preview an execution effect of the target application. Therefore, providing the plugin to the developer can greatly reduce a development threshold and provide more excellent experience to the developer.

Further, after successfully compiling the target plugin and the target code package on an application development terminal by using the developer tool, the application developer may package and upload the target plugin and the target code package to the data management server. The data management server receives the target plugin and the target code package uploaded for the target application, associates the target plugin and the target code package with the identifier of the target application for storage, and generates the configuration parameter of the target application. Therefore, the product can be released, that is, the target application may be provided to users for use.

A process in which the developer tool such as the IDE compiles the target plugin and the target code package to execute the target application may be as follows. During compiling, a WeChat developer tool retrieves a plugin of a corresponding domain, injects the plugin in advance (that is, analyzes and executes plugin implementation code), and then injects developer-related logic. The process specifically includes: pulling plugin content according to a plugin configuration and injecting the plugin content into a basic library; determining whether the target plugin includes a basic library domain plugin, and if so, injecting the basic library domain plugin; determining whether the target plugin includes an independent domain plugin, and if so, creating an independent domain and injecting the independent domain plugin; determining whether the target plugin includes a developer domain plugin, and if so, injecting the developer domain plugin, and then injecting the developer-related logic, the developer-related logic being developer code, such as game.js (a mini-game) or app-service.js (a mini-program); and determining whether the target plugin includes an open data domain plugin, and if so, injecting the open data domain plugin, then injecting open data domain code subcontext.js, and executing the target application (for example, a mini-game) after the injection is completed.

In this embodiment of this disclosure, the data management server may receive the first data acquisition request transmitted by the user terminal when the start instruction for the target application is detected. The first data acquisition request includes the application identifier of the target application. The configuration parameter of the target application is transmitted to the user terminal according to the application identifier of the target application. The configuration parameter includes the plugin configuration information and the code package configuration information. The second data acquisition request transmitted by the user terminal when it is determined that the locally cached plugins include the target plugin corresponding to the plugin configuration information is received. The second data acquisition request includes the code package configuration information. The target code package corresponding to the code package configuration information is transmitted to the user terminal, to cause the user terminal to execute the target application by using the target code package and the locally cached target plugin. In this way, the start speed of an application can be increased, the storage space of the user terminal can be saved, and the development costs of a developer can be reduced.

In some feasible implementations, a plug type may include one or more of a basic library domain plugin, a developer domain plugin, an open data domain plugin, or an independent domain plugin. When the developer applies for a plugin, the following configurations may be performed to submit plugin application information. For example, the target application is a mini-game.

(I) Configurations of the developer domain plugin, the independent domain plugin, or the open data domain plugin.

A mini-game developer may use the game.json through a simple configuration in the plugin. A mini-program developer may use app.json through a simple configuration in the plugin. game.json of the mini-game is used as an example. The submitted plugin application information includes the following:

```
1.  {
2.      "plugins": {
3.          "aaa": { //alias
4.              "provider": "wx123456789",
```

```
5.       "version": "1.0",
6.       "contexts":{"type":"openDataContext"},{"type":"isolatedContext"}, {"type":"gameContext"}
7.     }
8.   }
9. }
``` alias includes another name of the plugin, and means that a long path of the plugin may be replaced with a brief alias. provider is appid of the plugin applied for by the plugin developer on the data management server, and version is a version of the plugin. When the plugin developer uploads the plugin, the data management server maps the version of the plugin and the version stored in a backend. A type of the plugin is filled in contexts. openDataContext corresponds to the open data domain plugin. isolatedContext corresponds to the independent domain plugin. gameContext corresponds to a game domain plugin. contexts filled with nothing is the developer domain plugin by default. The independent domain plugin verifies validity of contexts. The same appid cannot be configured with other plugins. plugins indicates that a plurality of plugins can be configured and plugins can be configured in a subpackage.

(II) Configuration of the basic library domain plugin (that is, an official plugin)

```
1.       {
2.            "useSystemExtendedLib": {
3.               "name": "ccc"
4.                "version(including autoupdate)"
5.            }
6.       }
```

Name includes another name of the basic library domain plugin, which is the official plugin. Version is a version of the plugin. The plugin may alternatively be configured as an auto update version.

In some exemplary implementations, the application developer may use the plugin in the following manner:

using the developer domain plugin, the open data domain plugin, or the basic library domain plugin. A use method is:
  requirePlugin('aaa').

When the independent domain plugin is used in a developer domain or an open data domain, the independent domain plugin is used according to the following rules:

```
1.  requirePlugin('bbb', {
2.      enableRequireHostModule: true, // whether to allow the plugin
to use a host module, default by false
3.      customEnv: { // It is a value passed to the plugin, which is called
a plurality of times and overrides (Object.assign)
4.         wx,
5.         foo: {
6.           bar: 1
7.         }
8.      }
9.  })
```

In some exemplary implementations, when the data management server detects a request of the application developer for using the plugin, the request for using the plugin may be first parsed by using the basic library. A new version basic library implements a requirPlugin interface. A parameter format is "{alias}[/{filename}]". The implementation is to find a real module through the configuration according to alias and filename. game.json configured in the above is used an example:
  requirePlugin('aaa') // It is equivalent to requirePlugin ('aaa/index.js'), and
  may be parsed into
  require('_plugin_/wx123456789/indexjs') II. index.js is located according to main in plugin.json. In order to support both an old basic library version and a WeChat client version, a developer tool compiling backend needs to cause the implementation of requirePlugin (in the new version basic library) to be compatible with that in the old basic library version. For the old basic library version, the developer tool compiling backend needs to implement requirePlugin in the old basic library version in the same manner as that in the new basic library version, to support different versions.

In some exemplary implementations, during packaging of a code package of a mini-game/mini-programs using plugin, the developer domain plugin may be packaged into a code package of the mini-game in two manners.

In a first manner, the plugin is pulled and directly packaged into game.js (a mini-game) or app-service.js (a mini-program) for use by an old version WeChat client.

In a second manner, the plugin is separated from code, and only local developer domain code is provided for use by a new version WeChat client.

The open data domain plugin may be packaged into the code package of the mini-game in two manners.

In a first manner, the plugin is pulled and directly packaged into subcontext.js for use by the old version WeChat client.

In a second manner, the plugin is separated from code, and only local open data domain code is provided for use by the new version WeChat client.

For the independent domain plugin and the basic library domain plugin, since no complete package exists, there is only one packaging manner. Only local code is packaged, and plugin information of the independent domain plugin or the basic library domain plugin is stored in the data management server.

Figure 4A:
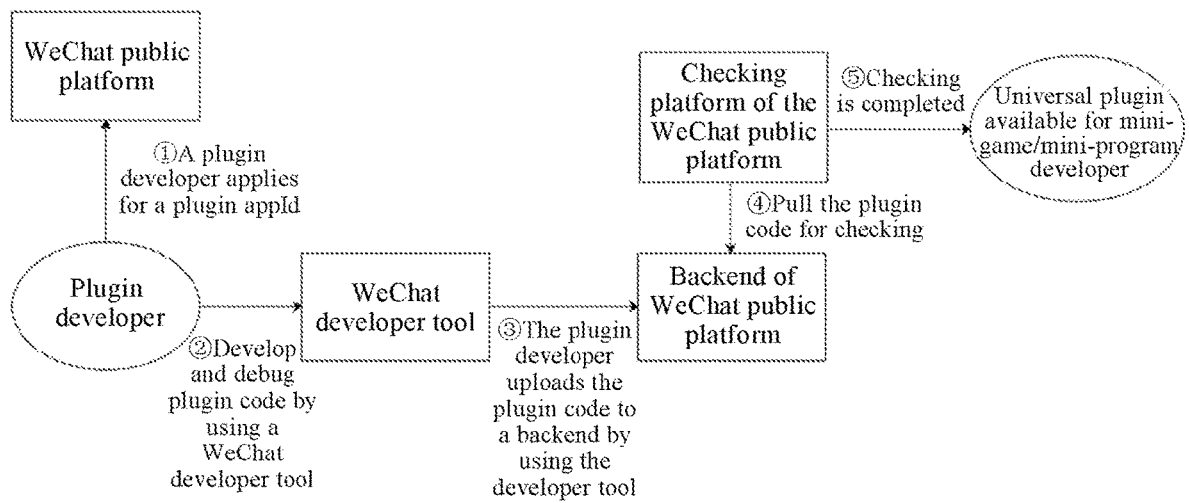
FIG. 4A is a schematic flowchart of developing a plugin according to an embodiment of this disclosure.

In some exemplary implementations, when the plugin developer develops a plugin on the data management server, the plugin developer may first apply for a type of the plugin. That is to say, the plugin developer may select the type of the to-be-developed plugin from various types such as the basic library domain plugin, the developer domain plugin, the open data domain plugin, and the independent domain plugin. The independent domain plugin is required to be designated as the independent domain plugin during initialization of the data management server, and cannot be changed later. As shown in FIG. 4A, the plugin developer may first apply for a plugin on a WeChat public platform, determine an identifier (such as appid) of the plugin, develop the plugin by using a WeChat developer tool, and upload the plugin after development and debugging to store the plugin in a backend of the WeChat public platform. Code of the plugin is pulled by a checking platform for checking. For example, a security risk and a size of implementation code of the plugin are checked. The plugin can be browsed on the WeChat public platform after being checked. During mini-game/mini-program development, the application developer may select a proper universal plugin for use according to requirements. A development process performed by the plugin developer may be as follows:

Each plugin has an individual plugin code directory. The plugin code directory is required to include plugin implementation code and plugin.json. A main configuration of plugin.json is as follows. An entry file of the plugin is filled in main:

```
1.      {
2.          "main": "index.js"//It is an exemplary entry file
3.      }
```

For an independent domain plugin, an API that is unique in a plugin context is accessed from pluginEnv:

```
1.      pluginEnv = {
2.          requireHostModule, // It is equivalent to require of a host mini-game, and can be acquired only after permission by the host mini-game
3.          customEnv: { } // It is a variable transmitted by the host mini-game
4.      }
```

After the plugin developer successfully debugs the plugin, the code of the plugin is uploaded by using the WeChat developer tool. A plugin user (for example, a mini-game/mini-program developer) may use the plugin code after checking.

Figure 4B:
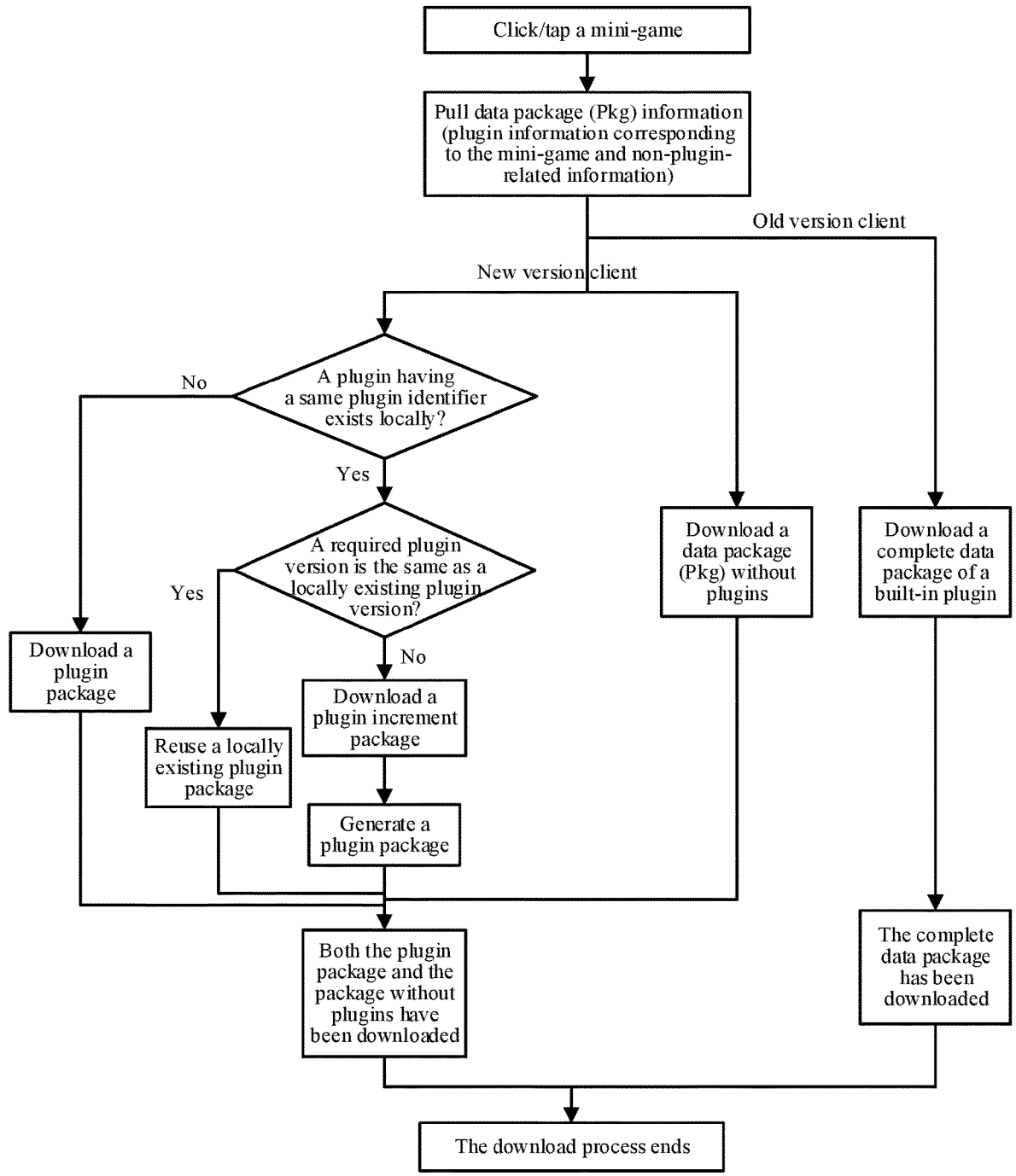
FIG. 4B is a schematic flowchart of data processing for starting a mini-game according to an embodiment of this disclosure.

In some exemplary implementations, as shown in FIG. 4B, for example, a user starts a mini-game on the user terminal. The user terminal detects that the user clicks/taps the mini-game, and pulls data package (Pkg) information (that is, the foregoing configuration parameter) of the mini-game from the WeChat public platform. The package information includes plugin information (that is, the plugin configuration information) and non-plugin-related information (that is, the code package configuration information) corresponding to the mini-game. If the user terminal executes the new version WeChat client, the user terminal first performs querying to determine whether a plugin having a same appid (a plugin identifier) exists locally. If the plugin having the same appid exists, it is determined whether a version of the required plugin is the same as a version of the local plugin. If the versions are the same, the locally existing plugin is reused. If the versions are different, a plugin increment package is downloaded from the WeChat public platform, and a complete plugin package of the required version is generated. If the plugin having the same appid does not exist, the complete plugin package (Pkg) of the required version is downloaded from the WeChat public platform. In addition, a code package (Pkg) without plugins is downloaded from the WeChat public platform. The complete plugin package and the code package without plugins are injected to execute the mini-game. By reusing the plugin, the development costs can be effectively reduced for the developer, the storage space of the client can be saved, and the start speed of the application can be increased. If the user terminal executes the old version WeChat client, the user terminal needs to directly download a complete package of a built-in plugin from the WeChat public platform, and the complete package of the built-in plugin is injected to execute the mini-game.

Figure 5:
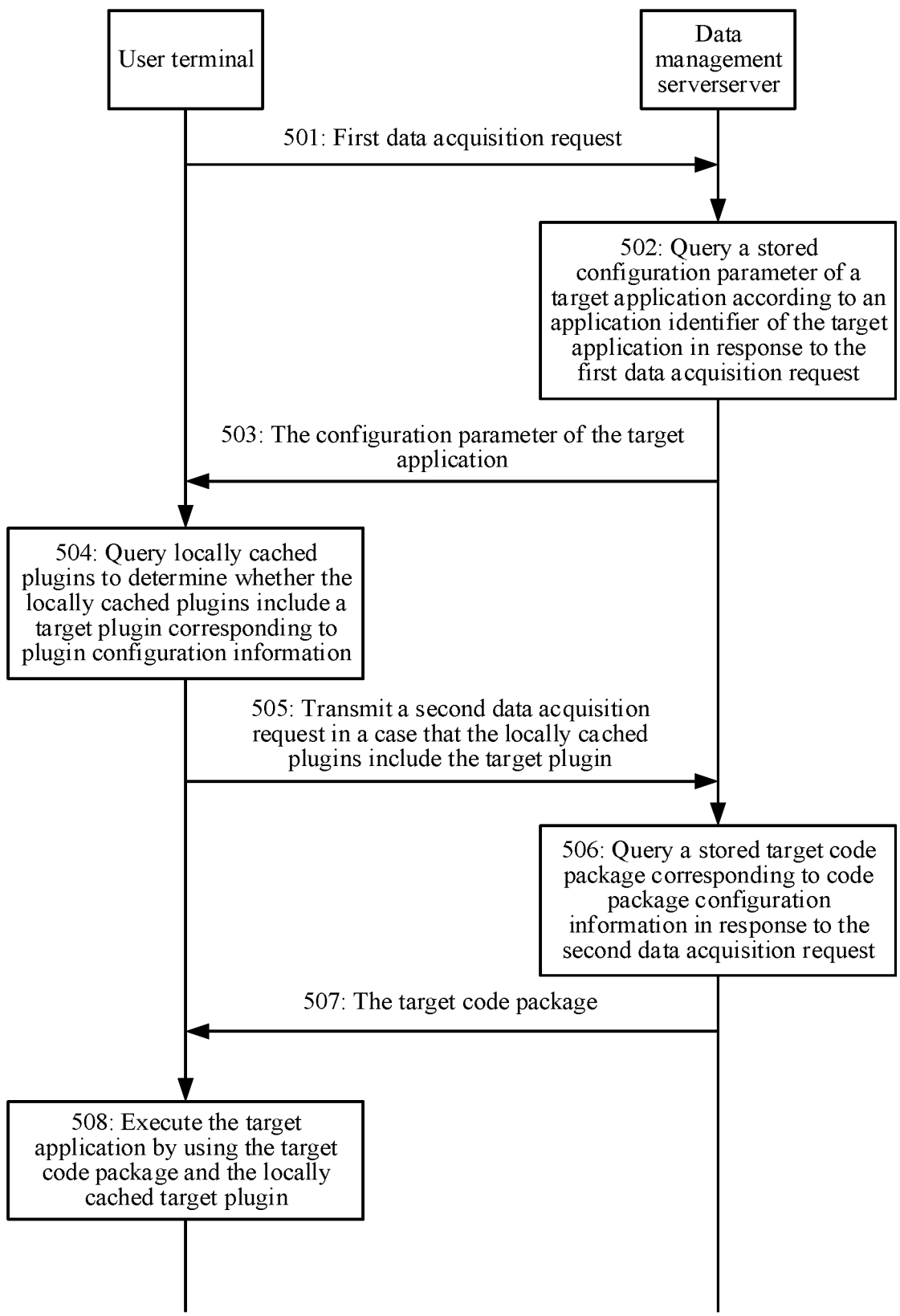
FIG. 5 is a schematic flowchart of still another method for starting an application according to an embodiment of this disclosure.

FIG. 5 is a schematic flowchart of still another method for starting an application according to an embodiment of this disclosure based on the data management system shown in FIG. 1. The method for starting an application includes the following steps:

501: A user terminal transmits a first data acquisition request to the data management server when a start instruction for a target application is detected, the first data acquisition request including an application identifier of the target application.

502: The data management server receives the first data acquisition request, and acquires stored configuration parameter of the target application according to the application identifier of the target application in response to the first data acquisition request.

The configuration parameter includes plugin configuration information and code package configuration information.

503: The data management server transmits the configuration parameter of the target application to the user terminal.

504: The user terminal receives the configuration parameter of the target application, and queries locally cached plugins to determine whether the locally cached plugins include a target plugin corresponding to the plugin configuration information.

505: The user terminal transmits the second data acquisition request to the data management server when the locally cached plugins include the target plugin, the second data acquisition request including the code package configuration information.

506: The data management server receives the second data acquisition request, and queries a stored target code package corresponding to the code package configuration information in response to the second data acquisition request.

507: The data management server transmits the target code package to the user terminal.

508: The user terminal receives the target code package, and executes the target application by using the target code package and the locally cached target plugin.

For specific implementations of steps 501 to 508, refer to the related descriptions in the foregoing embodiments. Details are not described herein again.

Figure 6:
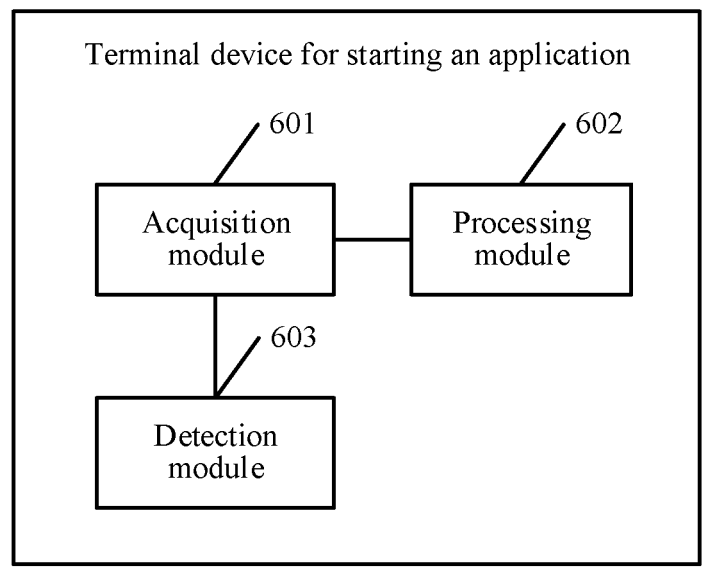
FIG. 6 is a schematic structural diagram of a user terminal for starting an application according to an embodiment of this disclosure.

FIG. 6 is a schematic structural diagram of a user terminal for starting an application according to an embodiment of this disclosure. The user terminal for starting an application includes:

an acquisition module 601, configured to: acquire a configuration parameter of a target application from a data management server when a start instruction for the target application is detected, the configuration parameter including plugin configuration information and code package configuration information; and acquire a target code package corresponding to the code package configuration information from the data management server when locally cached plugins include a target plugin corresponding to the plugin configuration information; and a processing module 602, configured to execute the target application by using the target code package and the locally cached target plugin.

Exemplarily, the plugin configuration information includes a plugin identifier and a plugin version of the target plugin. The apparatus further includes a detection module 603.

The acquisition module 601 is further configured to acquire locally cached plugins.

The acquisition module 601 is further configured to search the locally cached plugins for an undetermined plugin having a plugin identifier the same as the plugin identifier of the target plugin.

The detection module 603 is configured to use the undetermined plugin as the target plugin in response to detecting that the plugin version of the undetermined plugin is the same as the plugin version of the target plugin.

Exemplarily, the acquisition module 601 is further configured to acquire a first plugin increment package between the plugin version of the undetermined plugin and the plugin version of the target plugin from the data management server in response to detecting that the plugin version of the undetermined plugin is not the same as the plugin version of the target plugin.

The processing module 602 is further configured to generate the target plugin by using the undetermined plugin and the first plugin increment package.

Exemplarily, the plugin version is an auto update version. The acquisition module 601 is further configured to acquire a latest version of the target plugin from the data management server.

The detection module 603 is further configured to use the undetermined plugin as the target plugin in response to detecting that the plugin version of the undetermined plugin is the same as the latest version of the target plugin.

Exemplarily, the acquisition module 601 is further configured to acquire a second plugin increment package between the plugin version of the undetermined plugin and the latest version of the target plugin from the data management server in response to detecting that the plugin version of the undetermined plugin is not the same as the latest version of the target plugin.

The processing module 602 is further configured to generate a latest version target plugin by using the undetermined plugin and the second plugin increment package.

Exemplarily, the acquisition module 601 is further configured to acquire the target plugin corresponding to the plugin configuration information and the target code package corresponding to the code package configuration information from the data management server when the locally cached plugins do not include the target plugin corresponding to the plugin configuration information.

The processing module 602 is further configured to execute the target application by using the target code package and the target plugin.

Exemplarily, the processing module 602 is specifically configured to:

inject a basic library;

create an execution domain required for the target plugin by using the basic library; and inject the target plugin and the corresponding target code package into the execution domain to execute the target application.

Functions of the functional modules in the apparatus for starting an application in this embodiment of this disclosure may be implemented according to the method in the above method embodiment. For specific implementation processes, refer to the related description in the above method embodiment. Details are not described herein again.

Figure 7:
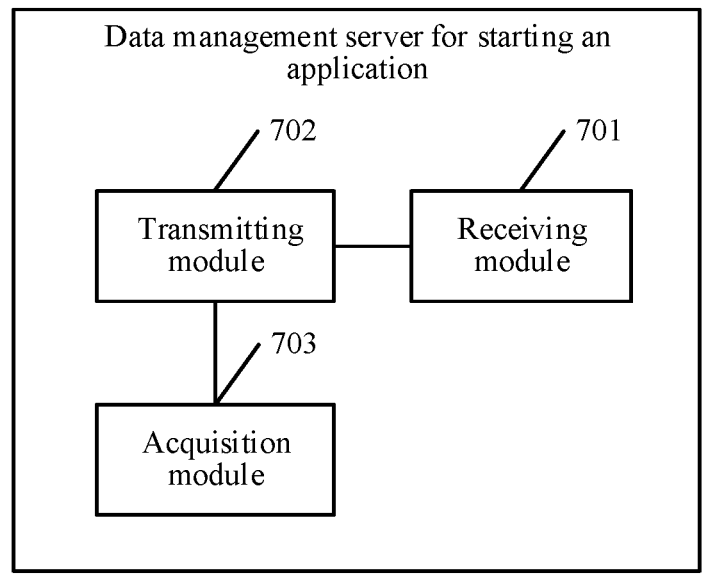
FIG. 7 is a schematic structural diagram of a data management server for starting an application according to an embodiment of this disclosure.

FIG. 7 is a schematic structural diagram of a data management server for starting an application according to an embodiment of this disclosure. The data management server for starting an application includes:

a receiving module 701, configured to receive a first data acquisition request transmitted by a user terminal when a start instruction for a target application is detected, the first data acquisition request including an application identifier of the target application; and a transmitting module 702, configured to transmit a configuration parameter of the target application to the user terminal in response to the first data acquisition request, the configuration parameter including plugin configuration information and code package configuration information.

The receiving module 701 is further configured to receive a second data acquisition request transmitted by the user terminal when it is determined that locally cached plugins include a target plugin corresponding to the plugin configuration information, the second data acquisition request including the code package configuration information.

The transmitting module 702 is further configured to transmit a target code package corresponding to the code package configuration information to the user terminal in response to the second data acquisition request, to cause the user terminal to execute the target application by using the target code package and the locally cached target plugin.

Exemplarily, the receiving module 701 is further configured to receive a third data acquisition request transmitted by the user terminal when it is determined that the locally cached plugins do not include the target plugin corresponding to the plugin configuration information, the third data acquisition request including the plugin configuration information and the code package configuration information.

The transmitting module 702 is further configured to the target plugin corresponding to the plugin configuration information and the target code package corresponding to the code package configuration information to the user terminal in response to the third data acquisition request, to cause the user terminal to execute the target application by using the target code package and the target plugin.

Exemplarily, the apparatus further includes:

an acquisition module 703, configured to acquire the target plugin and the target code package transmitted by an application development terminal after successfully compiling the target plugin and the target code package corresponding to the target application, associate the target plugin and the target code package with the application identifier of the target application for storage, and generate the configuration parameter of the target application.

Exemplarily, the acquisition module 703 is further configured to acquire plugin application information of the target application submitted by the application development terminal, the plugin application information including a plugin identifier, a plugin version, and a plugin type.

The acquisition module 703 is further configured to search a plugin library for a target plugin corresponding to the plugin application information.

The transmitting module 702 is further configured to transmit the target plugin to the application development terminal, to cause the application development terminal to compile the target plugin and the corresponding target code package.

Exemplarily, a plugin type includes one or more a basic library domain plugin, a developer domain plugin, an open data domain plugin, or an independent domain plugin.

Functions of the functional modules in the apparatus for starting an application in this embodiment of this disclosure may be implemented according to the method in the above method embodiment. For specific implementation processes, refer to the related description in the above method embodiment. Details are not described herein again.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 8:
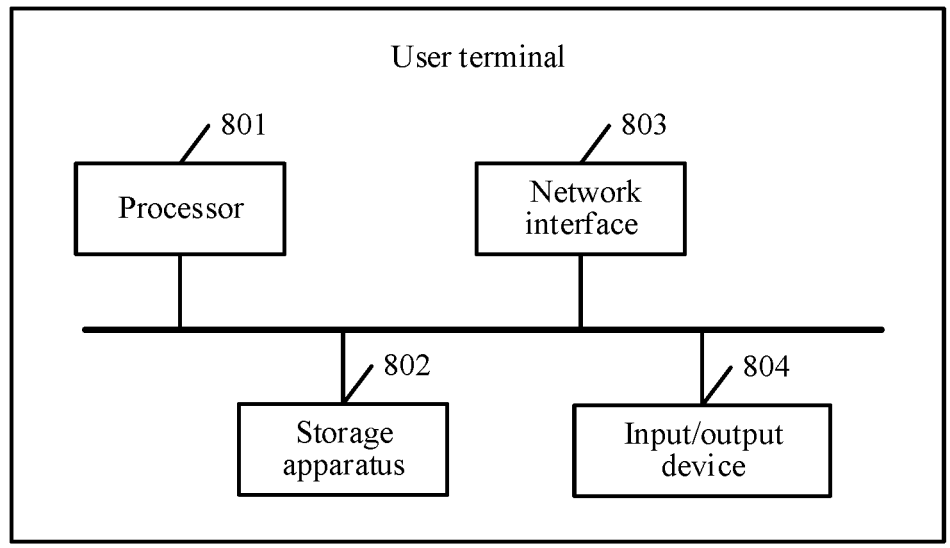
FIG. 8 is a schematic structural diagram of a user terminal according to an embodiment of this disclosure.

FIG. 8 is a schematic structural diagram of a user terminal according to an embodiment of this disclosure. The user terminal in this embodiment of this disclosure includes structures such as a power supply module, and includes a processor 801, a storage apparatus 802, a network interface 803, and an input/output device 804. Data can be exchanged among the processor 801, the storage apparatus 802, the network interface 803, and the input/output device 804.

The storage apparatus 802 may include a volatile memory such as a random-access memory (RAM); the storage apparatus 802 may also include a non-volatile memory such as a flash memory, a solid-state drive (SSD) or the like; and the storage apparatus 802 may alternatively include a combination of the foregoing types of memories.

The network interface 803 is configured to receive and transmit data.

The input/output device 804 may be a display screen, a touch screen, a microphone, a speaker, or the like, and is configured to detect a touch operation and output text, images, sounds, and the like.

The processor 801 may be a central processing unit (CPU) 801. In an embodiment, the processor 801 may alternatively be a graphics processing unit (GPU) 801. The processor 801 may alternatively be a combination of the CPU and the GPU. In an embodiment, the storage apparatus 802 is configured to store program instructions. The processor 801 may call the program instruction to perform the following operations:

acquiring a configuration parameter of a target application from a data management server when a start instruction for the target application is detected, the configuration parameter including plugin configuration information and code package configuration information;

acquiring a target code package corresponding to the code package configuration information from the data management server when locally cached plugins include a target plugin corresponding to the plugin configuration information; and executing the target application by using the target code package and the locally cached target plugin.

Exemplarily, the processor 801 is further configured to:
acquire the locally cached plugins;
search the locally cached plugins for an undetermined plugin having a plugin identifier the same as the plugin identifier of the target plugin; and
use the undetermined plugin as the target plugin in response to detecting that the plugin version of the undetermined plugin is the same as the plugin version of the target plugin.

Exemplarily, the processor 801 is further configured to:
acquire a first plugin increment package between the plugin version of the undetermined plugin and the plugin version of the target plugin from the data management server in response to detecting that the plugin version of the undetermined plugin is not the same as the plugin version of the target plugin; and
generate the target plugin by using the undetermined plugin and the first plugin increment package.

Exemplarily, the plugin version is an auto update version. The processor 801 is further configured to:
a latest version of the target plugin from the data management server; and
use the undetermined plugin as the target plugin in response to detecting that the plugin version of the undetermined plugin is the same as the latest version of the target plugin.

Exemplarily, the processor 801 is further configured to:
acquire a second plugin increment package between the plugin version of the undetermined plugin and the latest version of the target plugin from the data management server in response to detecting that the plugin version of the undetermined plugin is not the same as the latest version of the target plugin; and
generate a latest version target plugin by using the undetermined plugin and the second plugin increment package.

Exemplarily, the processor 801 is further configured to:
acquire the target plugin corresponding to the plugin configuration information and the target code package corresponding to the code package configuration information from the data management server when the locally cached plugins do not include the target plugin corresponding to the plugin configuration information; and
execute the target application by using the target code package and the target plugin.

Exemplarily, the processing module 801 is specifically configured to:
inject a basic library;
create an execution domain required for the target plugin by using the basic library; and
inject the target plugin and the corresponding target code package into the execution domain to execute the target application.

During specific implementation, the processor 801, the storage apparatus 802, the network interface 803, and the input/output device 804 described in this embodiment of this disclosure can perform the implementations described in the related embodiment of the method for starting an application in FIG. 2 or FIG. 5 provided in the embodiments of this disclosure, or can perform the implementations described in the related embodiment of the apparatus for starting an application in FIG. 6 provided in the embodiments of this disclosure. Details are not described herein again.

Figure 9:
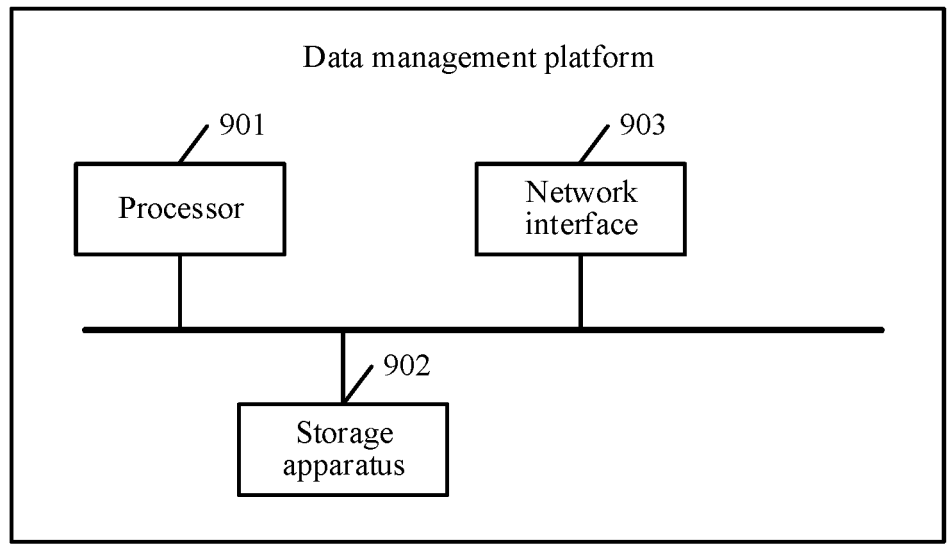
FIG. 9 is a schematic structural diagram of a data management server according to an embodiment of this disclosure.

FIG. 9 is a schematic structural diagram of a data management server according to an embodiment of this disclosure. The data management server in this embodiment of this disclosure includes structures such as a power supply module, and includes a processor 901, a storage apparatus 902, and a network interface 903. Data can be exchanged among the processor 901, the storage apparatus 902, and the network interface 903.

The storage apparatus 902 may include a volatile memory such as a random-access memory (RAM); the storage apparatus 902 may also include a non-volatile memory such as a flash memory, a solid-state drive (SSD) or the like; and the storage apparatus 902 may alternatively include a combination of the foregoing types of memories.

The network interface 903 is configured to receive and transmit data.

The processor 901 may be a central processing unit (CPU) 901. In an embodiment, the processor 901 may alternatively be a graphics processing unit (GPU) 901. The processor 901 may alternatively be a combination of the CPU and the GPU. In an embodiment, the storage apparatus 902 is configured to store program instructions. The processor 901 may call the program instruction to perform the following operations:

receiving a first data acquisition request transmitted by a user terminal when a start instruction for a target application is detected, the first data acquisition request including an application identifier of the target application;

transmitting a configuration parameter of the target application to the user terminal in response to the first data acquisition request, the configuration parameter including plugin configuration information and code package configuration information;

receiving a second data acquisition request transmitted by the user terminal when it is determined that locally cached plugins include a target plugin corresponding to the plugin configuration information, the second data acquisition request including the code package configuration information; and transmitting a target code package corresponding to the code package configuration information to the user terminal in response to the second data acquisition request, to cause the user terminal to execute the target application by using the target code package and the locally cached target plugin.

Exemplarily, the processor 901 is further configured to:

receive a third data acquisition request transmitted by the user terminal when it is determined that the locally cached plugins do not include the target plugin corresponding to the plugin configuration information, the third data acquisition request including the plugin configuration information and the code package configuration information; and transmit the target plugin corresponding to the plugin configuration information and the target code package corresponding to the code package configuration information to the user terminal in response to the third data acquisition request, to cause the user terminal to execute the target application by using the target code package and the target plugin.

Exemplarily, the processor 901 is further configured to:

acquire the target plugin and the target code package transmitted by an application development terminal after successfully compiling the target plugin and the target code package corresponding to the target application, associate the target plugin and the target code package with the application identifier of the target application for storage, and generate the configuration parameter of the target application.

Exemplarily, the processor 901 is further configured to:

acquire plugin application information of the target application submitted by the application development terminal, the plugin application information including a plugin identifier, a plugin version, and a plugin type;

search a plugin library for a target plugin corresponding to the plugin application information; and transmit the target plugin to the application development terminal, to cause the application development terminal to compile the target plugin and the corresponding target code package.

Exemplarily, a plugin type includes one or more a basic library domain plugin, a developer domain plugin, an open data domain plugin, or an independent domain plugin.

During specific implementation, the processor 901, the storage apparatus 902, and the network interface 903 described in this embodiment of this disclosure can perform the implementations described in the related embodiment of the method for starting an application in FIG. 3 or FIG. 5 provided in the embodiments of this disclosure, or can perform the implementations described in the related embodiment of the apparatus for starting an application in FIG. 7 provided in the embodiments of this disclosure. Details are not described herein again.

In addition, an embodiment of this disclosure further provides a storage medium. The storage medium is configured to store a computer program. The computer program is used for performing the method provided in the above embodiments.

An embodiment of this disclosure further provides a computer program product including instructions. The instructions, when executed on a computer, cause the computer to perform the method provided in the above embodiments.

In the foregoing embodiments, description of each embodiment focuses on a different part, and for parts that are not described in detail in one embodiment, reference may be made to the related description of other embodiments.

For ease of description, the foregoing method embodiments are stated as a combination of a series of actions. However, a person skilled in the art is to know that this disclosure is not limited to the described action sequence, because according to this disclosure, some steps may be performed in another sequence or simultaneously. In addition, a person skilled in the art is also to learn that the embodiments described in this specification are all exemplary embodiments, and the involved actions and modules are not necessarily required to this disclosure.

In the embodiments provided in this disclosure, it is to be understood that the disclosed apparatus may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces; indirect couplings or communication connections between apparatuses or units may be electric or in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of this disclosure. The foregoing storage medium includes: any medium that can store program code, such as a USB flash drive, a removable hard disk, a magnetic disk, an optical disc, a read-only memory (ROM, Read-Only Memory), or a random access memory (RAM, Random Access Memory).

The foregoing embodiments are merely intended for describing the technical solutions of this disclosure, but not for limiting this disclosure. Although this disclosure is described in detail with reference to the foregoing embodiments, persons of ordinary skill in the art are to understand that they may still make modifications to the technical solutions described in the foregoing embodiments or make equivalent replacements to some technical features thereof; as long as such modifications or replacements do not cause the essence of corresponding technical solutions to depart from the spirit and scope of the technical solutions of the embodiments of this disclosure.

What is claimed is:

1. A method for starting an application, performed by a user terminal, the method comprising:
    acquiring a configuration parameter of a target application from a data management server when a start instruction for the target application is detected, the configuration parameter comprising plugin configuration information and code package configuration information;
    acquiring, from the data management server, a target code package corresponding to the code package configuration information when locally cached plugins comprise a target plugin corresponding to the plugin configuration information; and
    executing the target application by using the target code package and the target plugin, wherein the executing comprises creating an execution domain and injecting the target plugin and the corresponding target code package into the execution domain to execute the target application.

2. The method according to claim 1, wherein the plugin configuration information comprises a plugin identifier of the target plugin and a plugin version of the target plugin, and before executing the target application by using the target code package and the locally cached target plugin, the method further comprises:
    acquiring the locally cached plugins;
    searching the locally cached plugins for an undetermined plugin having a plugin identifier the same as the plugin identifier of the target plugin; and
    using the undetermined plugin as the target plugin in response to detecting that a plugin version of the undetermined plugin is the same as the plugin version of the target plugin.

3. The method according to claim 2, further comprising:
    acquiring a first plugin increment package between the plugin version of the undetermined plugin and the plugin version of the target plugin from the data management server in response to detecting that the plugin version of the undetermined plugin is not the same as the plugin version of the target plugin; and
    generating the target plugin by using the undetermined plugin and the first plugin increment package.

4. The method according to claim 2, wherein the plugin version of the of the target plugin is an auto update version, and after searching the locally cached plugins for the undetermined plugin having the plugin identifier the same as the plugin identifier of the target plugin, the method further comprises:
    acquiring a latest version of the target plugin from the data management server; and
    using the undetermined plugin as the target plugin in response to detecting that the plugin version of the undetermined plugin is the same as the latest version of the target plugin.

5. The method according to claim 4, further comprising:
    acquiring a second plugin increment package between the plugin version of the undetermined plugin and the latest version of the target plugin from the data management server in response to detecting that the plugin version of the undetermined plugin is not the same as the latest version of the target plugin; and
    generating a latest version target plugin by using the undetermined plugin and the second plugin increment package.

6. The method according to claim 1, further comprising:
    acquiring the target plugin corresponding to the plugin configuration information and the target code package corresponding to the code package configuration information from the data management server when the locally cached plugins do not comprise the target plugin corresponding to the plugin configuration information; and
    executing the target application by using the target code package and the target plugin.

7. A method for starting an application, performed by a data management server, the method comprising:
    acquiring a target plugin and a target code package transmitted by an application development terminal;
    associating the target plugin and the target code package with an application identifier of a target application;
    receiving a first data acquisition request transmitted by a user terminal when a start instruction for the target application is detected, the first data acquisition request comprising an application identifier of the target application;
    transmitting a configuration parameter of the target application to the user terminal in response to the first data acquisition request, the configuration parameter comprising plugin configuration information and code package configuration information;
    receiving a second data acquisition request transmitted by the user terminal when it is determined that locally cached plugins comprise the target plugin corresponding to the plugin configuration information, the second data acquisition request comprising the code package configuration information; and
    transmitting a target code package corresponding to the code package configuration information to the user terminal in response to the second data acquisition request, to cause the user terminal to execute the target application by using the target code package and the locally cached target plugin.

8. The method according to claim 7, further comprising:
receiving a third data acquisition request transmitted by the user terminal when it is determined that the locally cached plugins do not comprise the target plugin corresponding to the plugin configuration information, the third data acquisition request comprising the plugin configuration information and the code package configuration information; and
transmitting the target plugin corresponding to the plugin configuration information and the target code package corresponding to the code package configuration information to the user terminal in response to the third data acquisition request, to cause the user terminal to execute the target application by using the target code package and the target plugin.

9. The method according to claim 7,
wherein acquiring the target plugin and the target code package transmitted by an application development terminal occurs after successfully compiling the target plugin and the target code package corresponding to the target application.

10. The method according to claim 9, wherein before acquiring the target plugin and the target code package transmitted by the application development terminal after successfully compiling the target plugin and the target code package corresponding to the target application, the method further comprises:
acquiring plugin application information of the target application submitted by the application development terminal, the plugin application information comprising a plugin identifier, a plugin version, and a plugin type;
searching a plugin library for the target plugin corresponding to the plugin application information; and
transmitting the target plugin to the application development terminal to cause the application development terminal to compile the target plugin and the corresponding target code package.

11. The method according to claim 10, wherein the plugin type comprises at least one of a basic library domain plugin, a developer domain plugin, an open data domain plugin, or an independent domain plugin.

12. A non-transitory computer-readable storage medium, storing a computer program, the computer program, when executed by a processor, causing a computer device to perform steps comprising:
acquiring, from a data management server, a configuration parameter of a target application when a start instruction for the target application is detected, the configuration parameter comprising plugin configuration information and code package configuration information;
acquiring a target code package corresponding to the code package configuration information from the data management server when locally cached plugins comprise a target plugin corresponding to the plugin configuration information; and
executing the target application by using the target code package and the target plugin, wherein the executing comprises creating an execution domain and injecting the target plugin and the corresponding target code package into the execution domain to execute the target application.

13. The non-transitory computer-readable storage medium of claim 12, wherein the plugin configuration information comprises a plugin identifier of the target plugin and a plugin version of the target plugin, and before executing the target application by using the target code package and the locally cached target plugin, the computer program, when executed by a processor, further causes the computer device to perform steps comprising:
acquiring the locally cached plugins;
searching the locally cached plugins for an undetermined plugin having a plugin identifier the same as the plugin identifier of the target plugin; and
using the undetermined plugin as the target plugin in response to detecting that a plugin version of the undetermined plugin is the same as the plugin version of the target plugin.

14. The non-transitory computer-readable storage medium of claim 13, wherein the computer program, when executed by a processor, further causes the computer device to perform steps comprising:
acquiring a first plugin increment package between the plugin version of the undetermined plugin and the plugin version of the target plugin from the data management server in response to detecting that the plugin version of the undetermined plugin is not the same as the plugin version of the target plugin; and
generating the target plugin by using the undetermined plugin and the first plugin increment package.

15. The non-transitory computer-readable storage medium of claim 13, wherein the plugin version of the of the target plugin is an auto update version, and after searching the locally cached plugins for the undetermined plugin having the plugin identifier the same as the plugin identifier of the target plugin, the computer program, when executed by a processor, further causes the computer device to perform steps comprising:
acquiring a latest version of the target plugin from the data management server; and
using the undetermined plugin as the target plugin in response to detecting that the plugin version of the undetermined plugin is the same as the latest version of the target plugin.

16. The non-transitory computer-readable storage medium of claim 15, wherein the computer program, when executed by a processor, further causes the computer device to perform steps comprising:
acquiring a second plugin increment package between the plugin version of the undetermined plugin and the latest version of the target plugin from the data management server in response to detecting that the plugin version of the undetermined plugin is not the same as the latest version of the target plugin; and
generating a latest version target plugin by using the undetermined plugin and the second plugin increment package.

17. The non-transitory computer-readable storage medium of claim 12, wherein the computer program, when executed by a processor, further causes the computer device to perform steps comprising:
acquiring the target plugin corresponding to the plugin configuration information and the target code package corresponding to the code package configuration information from the data management server when the locally cached plugins do not comprise the target plugin corresponding to the plugin configuration information; and
executing the target application by using the target code package and the target plugin.

18. A computer device, comprising:
a processor and a memory, the memory being configured to store program code and the processor being configured to execute the program code in the memory to perform the method of claim 1.

* * * * *